US006792616B1

(12) United States Patent
Jerding et al.

(10) Patent No.: US 6,792,616 B1
(45) Date of Patent: Sep. 14, 2004

(54) SYSTEM AND METHOD FOR PROVIDING A PLURALITY OF PROGRAMMING SERVICES IN A TELEVISION SYSTEM

(75) Inventors: Dean F. Jerding, Roswell, GA (US); John M. Schlarb, Duluth, GA (US); Arturo A. Rodriguez, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/071,550

(22) Filed: May 1, 1998

(51) Int. Cl.$^7$ .......................... H04N 5/445; H04N 7/173
(52) U.S. Cl. ........................ 725/38; 725/51; 725/132
(58) Field of Search ........................ 725/39, 51, 56, 725/100, 132, 140, 152, 91, 138, 144, 38; 348/552

(56) References Cited

U.S. PATENT DOCUMENTS

| | | | | | |
|---|---|---|---|---|---|
| 5,488,409 A | * | 1/1996 | Yuen et al. | ..................... | 725/41 |
| 5,539,920 A | * | 7/1996 | Menand et al. | ............. | 725/151 |
| 5,596,373 A | * | 1/1997 | White et al. | ................ | 348/569 |
| 5,600,364 A | * | 2/1997 | Hendricks et al. | ............. | 725/9 |
| 5,619,274 A | * | 4/1997 | Roop et al. | ................ | 348/461 |
| 5,754,258 A | * | 5/1998 | Hanaya et al. | ................. | 725/52 |
| 5,790,807 A | * | 8/1998 | Fishler et al. | ............... | 709/216 |
| 5,835,923 A | * | 11/1998 | Shibata et al. | .............. | 715/526 |
| 5,841,433 A | * | 11/1998 | Chaney | ........................ | 725/50 |
| 5,848,352 A | * | 12/1998 | Dougherty et al. | .......... | 725/110 |
| 5,850,218 A | * | 12/1998 | LaJoie et al. | .................. | 725/45 |
| 5,883,901 A | * | 3/1999 | Chiu et al. | ..................... | 370/508 |
| 5,905,492 A | * | 5/1999 | Straub et al. | ................ | 345/744 |
| 5,930,231 A | * | 7/1999 | Miller et al. | ................. | 370/210 |
| 5,933,475 A | * | 8/1999 | Coleman | ................. | 379/10.01 |
| 5,953,005 A | | 9/1999 | Liu | ............................ | 345/302 |
| 6,002,394 A | * | 12/1999 | Schein et al. | .................. | 725/39 |
| 6,002,401 A | * | 12/1999 | Baker | .......................... | 345/839 |
| 6,025,837 A | | 2/2000 | Matthews, III et al. | ..... | 345/327 |
| 6,047,129 A | * | 4/2000 | Frye | ............................ | 717/172 |
| 6,049,333 A | * | 4/2000 | LaJoie et al. | ................ | 345/718 |
| 6,049,831 A | | 4/2000 | Gardell et al. | .............. | 709/236 |
| 6,081,263 A | | 6/2000 | LeGall et al. | ............... | 345/327 |
| 6,175,362 B1 | * | 1/2001 | Harms et al. | ................ | 345/721 |
| 6,223,214 B1 | * | 4/2001 | Tufty et al. | .................. | 709/217 |
| 6,347,400 B1 | * | 2/2002 | Ohkura et al. | ................. | 725/60 |
| 6,405,239 B1 | | 6/2002 | Addington et al. | .......... | 709/203 |
| 6,442,755 B1 | | 8/2002 | Lemmons et al. | ............. | 725/47 |
| 6,460,179 B1 | * | 10/2002 | Kretz et al. | .................... | 725/37 |
| 6,493,876 B1 | | 12/2002 | DeFreese et al. | ........... | 725/100 |
| 6,526,577 B1 | | 2/2003 | Knudson et al. | .............. | 725/40 |
| 2001/0030661 A1 | | 10/2001 | Reichardt | .................... | 345/721 |
| 2003/0066085 A1 | | 4/2003 | Boyer et al. | ................. | 725/104 |

FOREIGN PATENT DOCUMENTS

WO          WO95/15658         6/1995

OTHER PUBLICATIONS

Article entitled "Putting language attributes in HTML" by Bert Bos, i18n coordinator, Webmaster, W3C®, last updated Apr. 29, 1997, pp. 1–2.

(List continued on next page.)

Primary Examiner—Vivek Srivastava
Assistant Examiner—Andrew Y Koenig (57) ABSTRACT

A system and method of providing for displaying a full service cable television system. The cable television system is adapted to provide a plurality of different user services. Accordingly, the system and method are designed to allow a user to access services in an efficient memory conserving fashion. Using a plurality of data tables, a cable television system is able to access a plurality of different services including cable channels, interactive program guides, pay per view activation, video on demand and interactive online services such as world wide web browsing and E-mail via their home television set.

105 Claims, 5 Drawing Sheets

OTHER PUBLICATIONS

Co–Pending U.S. patent application entitled: "Method and System for Uniform Resource Identification and Access to Television Services" Ser. No. 09/564,262; filing date May 4, 2000; Jerding, et al.

Welch, B. et al., "Prefix Tables: A Simple Mechanism for Locating Files in a Distributed System," International Conference on Distributed Computing Systems, May 1986, No. 6, p.p. 184–189.

* cited by examiner

SYSTEM AND METHOD FOR PROVIDING A PLURALITY OF PROGRAMMING SERVICES IN A TELEVISION SYSTEM

TECHNICAL FIELD

This invention relates in general to television systems, and more particularly to a system and architecture for providing a plurality of different classes of video and multimedia programming and including the logical interface method for accessing said plurality of video and multimedia services.

BACKGROUND OF THE INVENTION

The old definition of television services included a channel which was essentially nothing more than an analog broadcast video source. However, in the brave new world of digital programming, the home communication terminal ("HCT") otherwise known as the settop box has become a more powerful computing device than the typical analog cable TV set-top. In addition to supporting traditional analog broadcast video and functionality, these devices must also support an increasing number of services which are not analog (but rather digital), are not broadcast (two-way communication as for example E-mail), and are not video (such as web browser). These are all in addition to a host of other television services which are increasingly being demanded by customers, examples of which include audio and audio visual programming, advanced navigation controls, interactive program guides, impulse pay-per-view captivation, video on demand programming, advanced configuration controls, and other online services to name but a few. In order to provide these more powerful and complex features, the simple channel abstractions need to be extended beyond those which have traditionally been provided.

With the capabilities of advanced one-way digital networks, a multiplicity of applications become feasible such as downstream e-mail delivery, electronic magazines, electronic newspapers, and other graphical and textual services for news, sports and financial information, to name but a few of broadcast authorizable services. With the capabilities of a two-way, digital network other applications such as impulse pay-per-view, video on demand, electronic commerce and web browsing become possible. All these services can be offered in parallel with conventional broadcast television and can be considered differing service categories. As the number of services available via cable or satellite television increases, there is a need for a model in which the television viewer can access these services. Given that a viewer of newer generation digital HCTs can access up to thousands of channels and services available, there will be a large amount of service and channel definition information that needs to be transmitted from the headend or server location to the client or HCT. Traditional methods of broadcast television and services in cable television systems do not provide the necessary amounts of information to support all these channels and services, nor are they capable of efficiently transmitting, storing, accessing, and processing the corresponding large amounts of information in the HCT.

Cost limitations on HCT manufacture impose limitations in compute, memory, and internal machine bus bandwidth that in turn limit the amount of compute resources required to implement increasing digital video and multimedia functionality. Consequently, it would be desirable to provide a system in which required service related information is transmitted from the headend to the HCT in a methodical fashion so as to minimize: required network transmission bandwidth; time to organize the information for storage in the HCT; memory footprint of the information in the HCT; and the amount of time required to then access the information in the HCT. Additionally, this information must be updated in an efficient manner such as that when the services and channel lineup are changed the HCT is provided the new information.

It would also be desirable to provide this system and method in which a particular application for a specific service is preloaded on the HCT and, if not, arrange for it to be acquired from the headend and loaded. This, of course, would require the ability to have two-way digital cable TV network for communication between the headend and the HCT, or an advanced one-way digital network in which system and method acquires specific broadcast service information by accessing and retrieving data with a predetermined file name and identification, such file retrieved from a broadcast file system ("BFS").

Accordingly, there exists a need to provide a mechanism whereby applications on the HCT can be activated from the server via a signaling message received from the HCT, to provide the user with services such as Emergency Alert Messages, email, and other messaging.

DETAILED DESCRIPTION OF THE PREFERRED EMBODIMENTS

While the specification concludes with claims defining the features of the invention that are regarded as novel, it is believed that the invention would be better understood from a consideration of the following description in conjunction with the drawing figures in which like reference numerals are carried forward.

Figure 1:
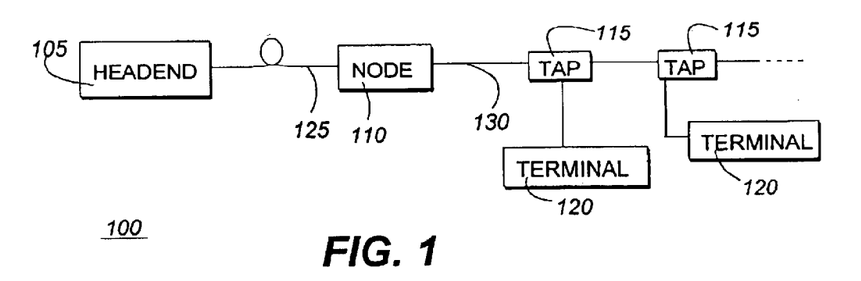
FIG. 1 is a block diagram of a cable television system in accordance with the present invention.

Referring now to FIG. 1 there is illustrated therein a block diagram of a cable television system 100 including a headend 105 for receiving satellite television signals, demodulating the signals down to base band, and transmitting the signals over the system 100. The transmitted signals can, for instance, be radio frequency (RF) signals, although they may more preferably be optical signals that are transmitted over a communications medium such as a fiber optic cable 125. When optical signals are transmitted by the headend 105, one or more nodes 110 are included in the system 100 for converting the optical signals to RF signals that are thereafter routed over other media such as coaxial cables 130. Taps 115 are provided within the cable system 100 for splitting the RF signal off to subscriber equipment, such as settop terminals 120, cable ready televisions, video cassette recorders (VCRs) or computers.

Figure 2:
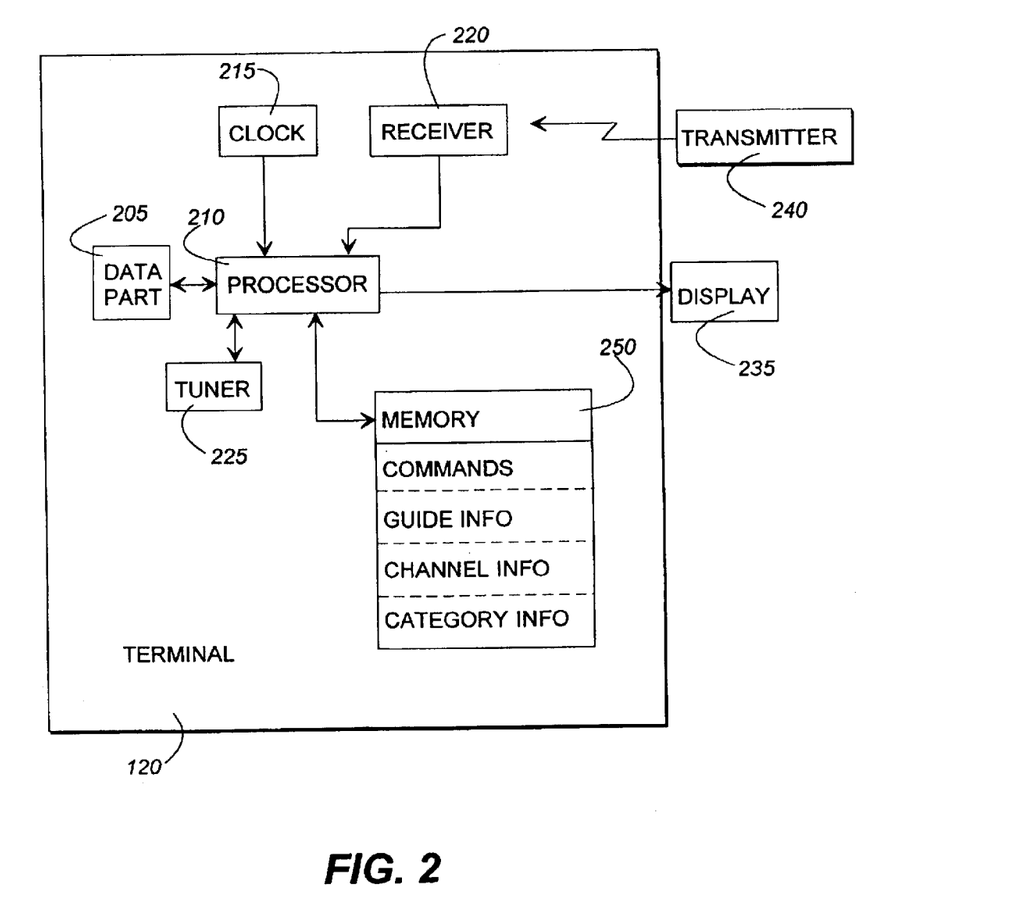
FIG. 2 is an electrical block diagram of a settop terminal included in the cable television system FIG. 1, in accordance with the present invention.

Referring now to FIG. 2, there is illustrated therein a block diagram of the home communication terminal 120 and other system equipment is shown. The terminal 120 is typically situated within the residence or business of a subscriber. It may be integrated into a device that has a display 235, such as a television set, or it may be a stand alone unit that couples to an external display, such as a display included in the computer or a television, and that processes television signals for presentation to subscriber on the display. The terminal 120 preferably comprises a data port 205 for receiving the RF signals, which can include video, audio and data information, from the tap and providing any reverse information to the tap for transmission back to the headend. The terminal 120 further includes a processor 210 for controlling operations of the terminal 120 and for driving the display, a clock 215 for providing timing functions, and a tuner 134 for tuning into a particular audio, video, and/or data channel. Additionally, the terminal 120 includes a receiver 220 for receiving externally generated information, such as viewer inputs or commands from other devices. Viewer inputs could, for example, be provided via transmitter 240, such as buttons or keys located on the exterior of the terminal 120 or a handheld remote control device that includes user actuated buttons. Additionally, in certain embodiments, terminals include interface connectors for Ethernet port, Serial port, and Universal Serial Bus port.

A memory 250, such as a nonvolatile volatile random access memory, coupled to the processor stores operational parameters such as commands that are recognized by the processor. The memory also stores program and application information that can, for instance, be downloaded over the system to the terminal. The program information includes program guide information that is displayed for the subscriber in the format of a program guide including a listing of channels, programs for viewing on the channels, and times during which the programs are shown. The program information also includes channel information such as the channel number and identification information, e.g., ESPN, Disney, WXIA, etc.

As noted above, in the world of digital programming, services are no longer considered to be simply traditional analog broadcast services, but will include advanced one-way digital network services and a whole host of additional two-way services such as web browsing, video on demand, and E-mail to name but a few. In order to provide these more powerful and complex features, the simple channel abstraction needs to be extended so as to provide for each of these different services in both one-way and two-way digital networks. The instant invention provides a Service Application Manager ("SAM") system and method that implements a model in which a viewer can access services. Each service identification consists, for example, of an application to run and a parameter, such as data content, specific to that service. Many services may be defined using the same application component, however with different parameters. For example, an application that can tune video programming would be executed with one set of parameters to view, for example, HBO, and a separate set of parameters to view, for example, CNN. Each association of the application components (in this case tune video) and one of the parameter components (i.e., HBO or CNN) represents a particular service that has a unique service identification. Each of the other services described above, such as text channels, pay-per-view, video on demand and web browsing fit nicely within the service model. In addition to an application and parameter, each service also has an identity, which may include a short textual description (such as call letters for a particular television station), a long textual description, and a logo image.

Additional service attributes in certain embodiments include multimedia service attributes. A service's identity is optionally augmented with an introductory audio that is played when the service is launched. A short "Welcome to ABC" song or voice with musical background, where such audio is distinctively associated with service is an example. Likewise, a service's identity is optionally augmented with an audio for when service is terminated or suspended.

In other embodiments, a special effect when starting a service, including animated transition into the service such as morphing from an image of service logo to displayable service, or graphics transitions such as implosion and fades, may be associated with the service. Likewise, a special effect may be associated with a service when it is terminated or suspended.

In another embodiment, any of a partial or full-size image, video or video widget serving the function of a 3-D logo is associated with a service and displayed momentarily when service is launched. Same or different counterpart media is employed for service termination or suspension. The specified association of media with service may include an amount of time to display or play the media. Additionally, media can be combined with special effects.

Service attributes may or may not necessarily be for identification services but for efficiency of system and method. Such service attributes include: cable-operator-only launchable service messaging viewer with emergency alerts or reminders to pay bill. A service can be classified with an attribute as both, a cable-operator and viewer, launchable service. Alternately, a service attribute is an installer-only or repair-representative-only launchable service.

A service can be classified with an attribute as one that can be launched by time, rather than immediately to responding to viewer input or headend signaling. Furthermore, such service activation time is designated by:

A. a prespecified time after viewer activation or server signaling; or
   B. input by viewer or data transmitted during server signaling, and/or possibly with:
      1. periodic pre-specified interval values; or
      2. periodic pre-specified interval values specified by viewer or headend message.

Examples of a service that is launched periodically is a ticker-tape that displays periodic information updates of sports scores or stock prices. Specification of service display duration is included appropriately in the aforementioned. A service can also be classified with an attribute as a "service not-blockable by viewer" that is activated by cable headend operator.

A service may have the attribute of a background-service, not visible to viewer. In a HCT, a service that enables HCT to route Internet Protocol data or other information received from and to digital network and passed via one of many possible HCT communication ports to and from one or more of many computing devices in the viewer's premises, establishes a communication link between the digital network and computing devices. Such computing devices include an advanced phone, a hand-held electronic organizer device, a personal computer, an appliance such as a stove, and therefore the HCT acts as a cable modem.

Although a service runs in the HCT in the forementioned, the application running on the HCT serves as an "enabler" and possibly as a communication switch while the designated computing device and communication port are specified as parameters of the service. HCT communication ports include Ethernet port, serial port, Universal Serial Bus (USB), to name a few.

In order to access this growing number of services, it is necessary to provide a system which can meet functionality, efficiency, and memory footprint requirements constrained by the capabilities of the HCT. The Service Application Manager ("SAM") architecture consists of a SAM server component, a SAM client component, and the interface between-the server to the client. This interface consists of the SAM information tables broadcast on the BFS (an example of which is disclosed in commonly assigned patent application serial No. PCT/US97/22535, the disclosure of which is incorporated herein by reference) and the update and signaling messages passed from server to client. In the context of the system illustrated in FIGS. 1 and 2, the SAM server component is part of the headend, while the SAM client component resides in the HCT. The SAM server stores the current SAM information which consists of a Service Table, a Display Channel Table, a Split Channel Table, the Bulk Table, and the Logo Table. The SAM provides an interface for a server operator to enter and modify the information on the SAM, and to broadcast it to SAM clients notifying them of, for example, information changes. The SAM also allows the applications which execute a particular service to be introduced into the system. Each application has a server component and a client component. The application server may execute all the time, while an application client may be downloaded to the HCT and executed only when the viewer requests the service be activated.

The SAM server provides an interface through which applications are placed on the network, services registered, a channel lineup specified, and the SAM information stored and modified. The SAM server may also allow changes to the SAM information table (as described herein below) to be posted to the network together with a time specified by the cable operator.

The SAM client provides an interface through which applications may be activated and SAM information can be accessed. One functionality of the SAM client is the activation of an application client on the HCT, either to provide a specified service or because of a signaling message from the server.

As noted above SAM information includes at least five different tables: a Service Table stores information about all services available on the system and each service is identified by a specific service ID; a Display Channel Table ("DCT") provides an abstraction to match a display channel number to a service ID (and vice versa); a Split Channel Table supplements the DCT with information about split channels; a Bulk Table is provided for storing actual string and parameter data as well as attributes of each service. The data for each table may be transmitted from the server to the client by writing it into a binary file and then placing the file on a broadcast file system ("BFS") such as that disclosed in the aforementioned copending PCT Patent Application, the disclosure of which is incorporated herein by reference. Updates to the various table increments the tables' version number. Accordingly, the system will always access the most recent version of a particular table. This is important as some channels, for example the Split Channel Table, will change fairly regularly and indeed can change on a daily basis.

When the SAM server changes the SAM files being broadcast on BFS, the SAM client will receive a message from the SAM server via the HCT operating system. This message contains the current version number of each SAM table, as well as flags optionally specifying a "forced" update of each table. For each table, the SAM client will check the version number specified in the message versus the local table versions and only if they are different retrieve the file from the BFS and check the version number a second time (unless the "force" flag is set for that table, in which case the file on BFS is always checked). If a file version being transmitted on the BFS is different than the local file stored in the SAM client, the SAM client will update its tables using the new files.

The update process works such that while the SAM client is reading new files, the old files are still available to applications on the HCT. Only when the SAM client has completed reading any new tables does it actually update the current tables to the new information. During this very brief "swap", both old and new tables are locked such that the data cannot be accessed via the SAM client interface.

The update process is also robust such that the SAM client can handle the various non-deterministic aspects of the SAM server's use of the BFS. For example, the synchronization of the message being received at the client, the file being changed on the BFS server, and the file being changed as seen by the BFS client are all affected by network latency and could happen in different orders.

After receiving an information update, the SAM client will notify interested applications via the HCT OS that the SAM information has changed. To allow other components to update their service and channel related information, the SAM client must keep the last version of the replaced data tables in memory.

The various SAM information tables are transmitted in band, over QAM, for fast access by the SAM client during HCT boot. Copies of the tables, with the exception of the Logo Table, are also transmitted out-of-band, over QPSK. The out of band files are used by the SAM client during SAM information update such that the viewer's use of the HCT is not interrupted (access to in-band data requires use of the HCT tuner).

Figure 3:
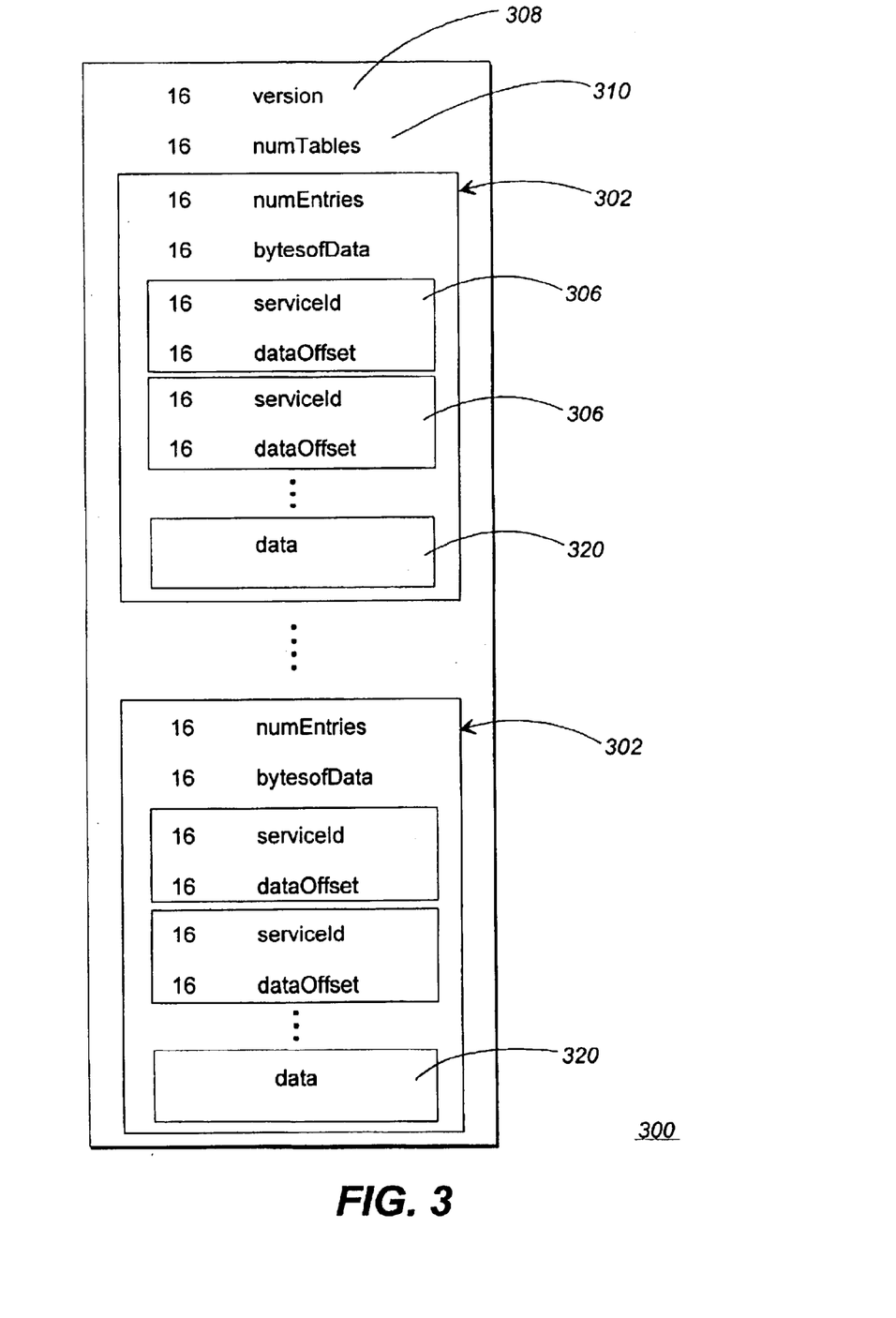
FIG. 3 is a block diagram service application manager service table for a cable television system, in accordance with the instant invention.

Referring now to FIG. 3 there is a block diagram representation of the Service Table used in the preferred embodiment of the Service Application Manager, all in accordance with the instant invention. The Service Table 300 contains the service identification information, with each service assigned a unique service ID. The header information at the beginning of the Service Table includes the table version 308 and the number of sub tables 310. This is followed by the service subtables. Each subtable 302 includes the number of subtable entries, the length of the service data segment, an index, and finally the service data segment. The index includes a pairing of a service ID and the offset into the data segment where the service data is actually found. Accordingly, if a particular subtable provides information relating to 25 different services, the index will include 25 blocks, each block corresponding to a single service. The service IDs 306 across the entire Service Table are stored in increasing order, but are not necessarily contiguous. Each service subtable can store up to 64 Kb of service data.

To find a service ID in the Service Table, a binary search is done first on the subtables to determine which subtable a service ID is in, and then within the index of the subtable to locate the offset of the service data in that subtable. The offset is then used to access the data directly.

Each service data record includes all of the service attributes. One such attribute is a description ID. The description ID is an index into the Bulk Table for the string describing the service. In one embodiment, each string is made up of three fields: (1) an ascii string decimal number specifying the length of the short description in characters; (2) a short description ascii string; and (3) a long description ascii string. For example, the following strings describe a service whose short description is "WTHR", and the long description is "The Weather Channel"; "4WTHR The Weather Channel."

A second piece of data which is located in the data block 320 is a logo ID and which itself is an index into the Logo Table for the service's logo pixel map. An application Universal Resource Locator ("URL") ID is a third index into the Bulk Table for the URL string identifying the application client in the broadcast file system. The final attribute is an application dependent parameter, which is interpreted as a number (i.e., a source ID) or an index into the Bulk Table for a parameter string or parameter data.

In order to efficiently store service records for thousands of services, the invention specifies a record with variable-length fields. The idea is to use only as much memory for a field as is needed for the particular value of that field. The field Size attribute of the service is used to specify the size, in bytes, of each field. The field Size byte uses 2 bits to encoding the number of bytes minus 1 for each field. A value of "00" in a field means it is 1 byte, "01" means 2 bytes, etc. No matter what the actual field size, the access operations always return the field value in 32 bits. The access routines must operate at a byte level when retrieving fields larger than a byte because the data will not be word or half-word aligned. The format of the field Size byte is shown below:

field Size: for(i=bit 0; i<8; i++){
    description ID size—1:2
    logoId size—1:2
    applicationId size—1:2
    parameter size—1:2
}

Thus, each record varies in length from 5 to 17 bytes.

Figure 4:
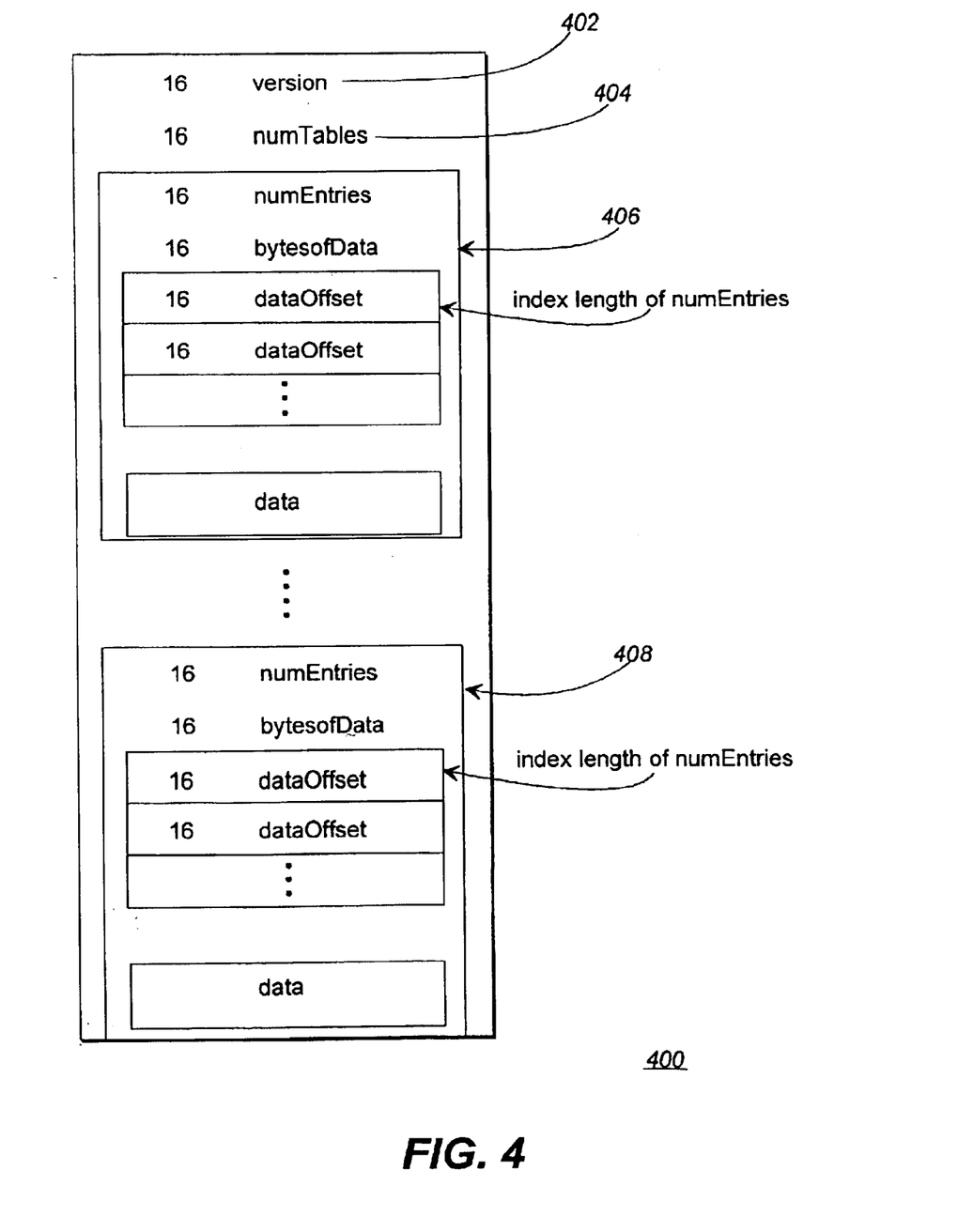
FIG. 4 is a block diagram representation of the display channel table used in connection with the service application manager of the instant invention.

Accordingly, and referring now to FIG. 4, there is illustrated therein in a block diagram representation of the Bulk Table used in connection with the Service Application Manager, all in accordance with the instant invention. The Bulk Table 400 contains data relevant to the services, such as strings for descriptions, application URLs, and parameter data. As with the Service Table 300 of FIG. 3, the Bulk Table comprises several initial entries 402, 404 as described above, followed by a plurality of bulk information subtables 406 and 408.

Each subtable includes the number of subtable entries, the length of the bulk data segment, an index, and finally the bulk data segment. The index includes a pairing of a bulk ID and the offset into the data segment where the bulk data is actually found. Accordingly, if a particular subtable provides information relating to 25 different bulk data entries, the index will include 25 blocks, each block corresponding to a single bulk data item. The bulk IDs across the entire Service Table are stored in increasing order, but are not necessarily contiguous. Each bulk subtable can store up to 64 Kb of bulk data.

To find a bulk ID in the Bulk Table, a binary search is done first on the subtables to determine which subtable a bulk ID is in, and then within the index of the subtable to locate the offset of the bulk data in that subtable. The offset is then used to access the data directly.

The size and the contents of the Bulk Table itself depends on the size and type of information which is required to be stored therein. Several types of BulkData are defined in the following. The application URL is simply a NULL-terminated ASCII string. The service description is two concatenated NULL-terminated ASCII strings, the first being the short description and the second being the long description. For example, "WGNX\0CBS Atlanta\0" is a possible description string. A string is simply a NULL-terminated ASCII string. Arbitrary data can be stored in the Bulk Table and a pointer to that data handed out via an API in the SAM Client. It is then up to the application client to interpret the content of the data.

Figure 5:
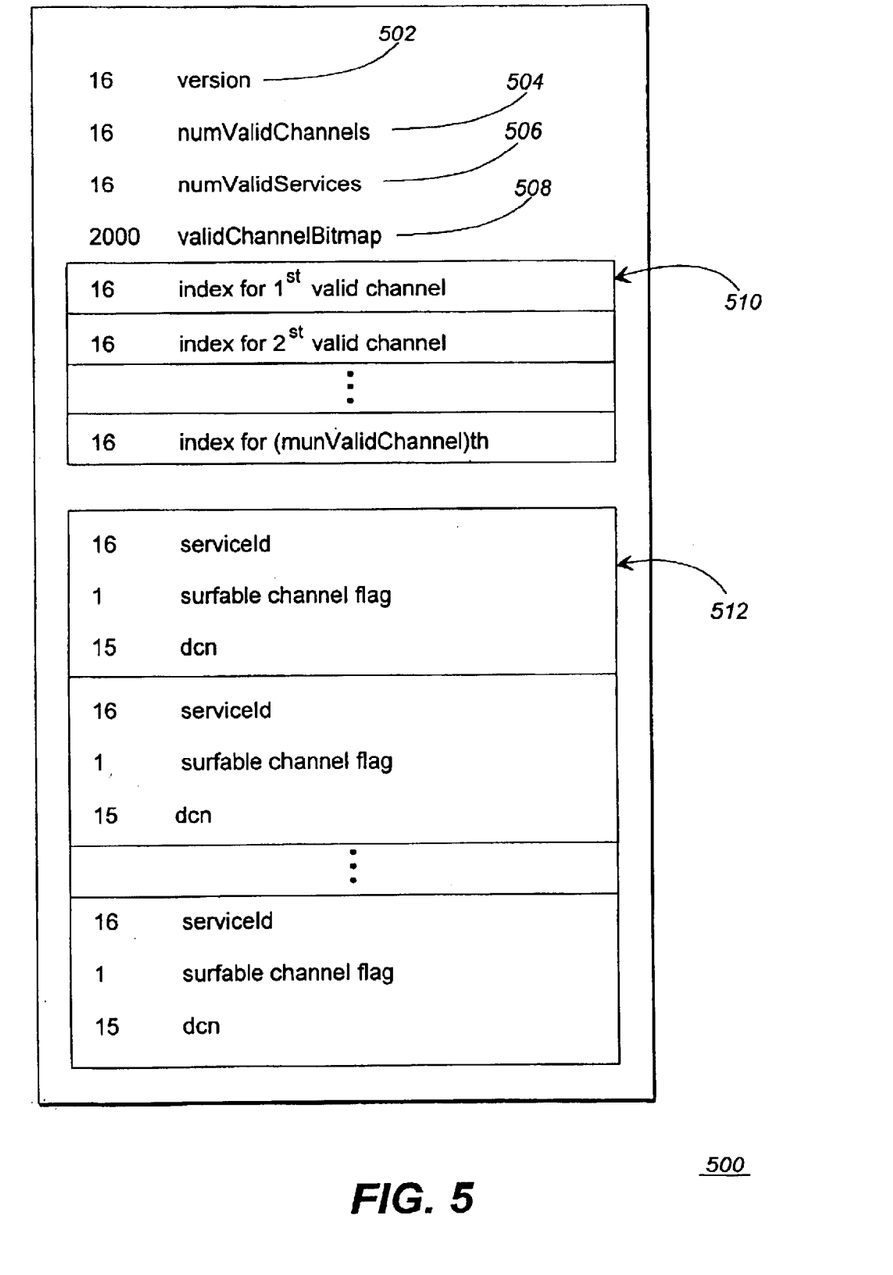
FIG. 5 is a block diagram representation of a split channel table used in connection with the service application manager, in accordance with the instant invention.

Referring now to FIG. 5, there is illustrated therein a block diagram representation of the Display Channel Table used in connection with the Service Application Manager, all in accordance with the instant invention. The Display Channel Table 500 is used to map service IDs to channel numbers displayed to the viewer (Display Channel Number, or DCN). In one embodiment of a cable system using the SAM, the Display Channel Table can be specified on a per-hub basis. This allows different neighborhoods of subscribers to receive different channel lineups.

The Display Channel Table is constructed to allow optimal access time to determine the service ID for a particular service or the service ID for a particular DCN. Both transformations are required by applications executing in the HCT such as the channel navigator and the program guide.

The Display Channel Table begins with a version number 502, the number of valid channels in the channel index 504, and the length of the valid service index 506. This is followed first by a valid channel bitmap 508, containing a bit for each channel in the cable system. For each channel that is valid, the corresponding bit position is set in the valid channel bitmap. Next is a valid channel index 510, each entry associated with a valid channel in the bitmap, whose content is an index into the service/DCN index that follows. The service/DCN index contains an entry for each valid service ID and Display Channel Number pair. Within each Display Channel Number in that pair is a channel flag (the most-significant-bit of the DCN). This flag indicates whether or not the DCN is surfable, i.e. can be reached by the user incrementing or decrementing throughout the channel lineup. There exists a service ID/DCN pair for every combination of service and DCN, where a service can be associated with more than one channel.

These data structures can be better understood by explaining how the translation for service ID to DCN and vice-versa takes place. To translate from DCN to service ID, first the bit for the DCN in the valid channel bitmap is checked. If the bit is set, the channel is valid, and the index for that channel must be determined. The index is exactly Nth valid channel which the DCN happens to be, or the number of bits set in the valid channel bitmap up to and including the bit representing the DCN. This lookup is made compute efficient by using a table which stores the number of bits set in a single byte for each decimal value of that byte. Thus, the channel index can be determined by taking the decimal value of each byte in the valid channel bitmap, translating the decimal value to a "number of bits set" using the lookup table, and accumulating this count for each byte in the valid channel bitmap up to the byte for the DCN. The remaining bits in the byte where the DCN bit is located are added by shifting and masking.

The number of bits set is then directly the Nth valid channel for that DCN, which is directly the offset into the channel index for that DCN. The channel index contains the offset into the service/DCN index for that DCN. Once this offset is known, the service ID for that DCN is the upper two bytes of the 32-bit service ID/DCN value. The total search time is then O(n) where n is the number of total possible channels. This is achieved without having to store for example an array of size total number of channels, using only an array of size total number of channels divided by eight (the bitmap) plus an array of size number of valid channels.

To look up a service ID for a DCN, a binary search on the service ID/DCN index 512 is done. This index is sorted in increasing order, such that the search is O(log (number of valid service/DCN entries)).

In addition to the services described above, the SAM supports the ability to split channels provided over the system. A split channel is one in which there is more than one service which is provided on that channel during a 24 hour period. One embodiment of the SAM may support split channels, where each of which shows two services, and which may change between those two services up to three times in a 24 hour period. For example if the channel is specified as a split channel with service X and service Y, starting at midnight the following splits are available: XY, XYX, XYXY. Split channels are identified in the Display Channel Table in both the channel index and the service ID/DCN index using a reserved constant. This indicates to the SAM client to lookup the information for the requested DCN in the Split Channel Table. There is always a Split Channel Table for each Display Channel Table in which a split channel is identified.

Figure 6:
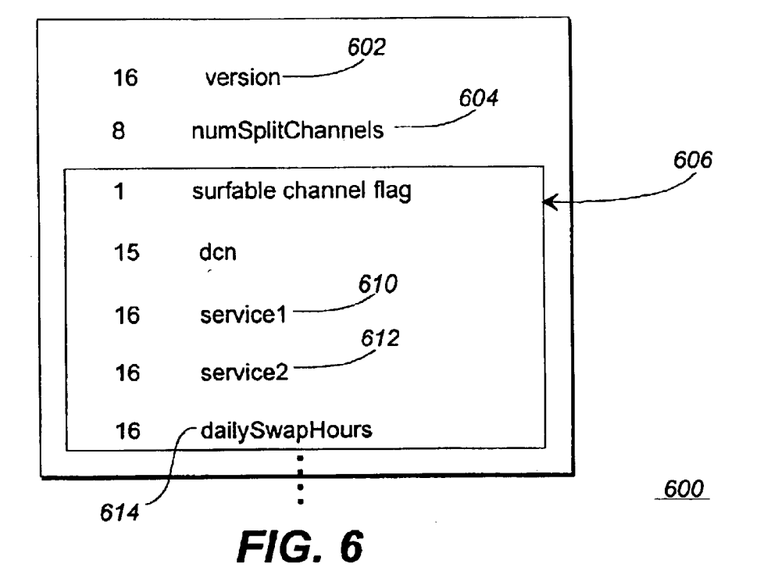
FIG. 6 is a block diagram representation of a bulk table used in connection with the service application manager in accordance with the instant invention.

Accordingly, referring now to FIG. 6, there is illustrated therein a block diagram representation a Split Channel Table 600 for use in connection with the Service Application Manager, all in accordance with the instant invention. The Split Channel Table, like the other tables, includes a number of initial entries such as initial entry 602 and 604. Initial entry 602 is version which specifies the most recent version of the split channel table allowing the SAM system to know that it is working with the most recent version of information. The second entry 604 specifies the number of split channels in the channel lineup. Accordingly, and in FIG. 6, the number of split channels identified would be one as only one split channel record 606 is illustrated in split channel table 600. It is to be understood, however, that any number of split channels may be supported by this system, and the invention is not so limited. The split channel record 606 includes a number of pieces of information, including, for example, the DCN being split 608, the identities of the services which are splitting the channel 610 and 612, and a time flag 614 which specifies the hours at which services are being provided on the channel. These times are specified such that service 1 is on by default at midnight in any given day. Each time then marks a swap to service 2 and back, continuing according to the number of swaps. The core channel management application in the HCT uses this information such that service swaps take place automatically and are done by the client. This differs from existing analog systems where split channels are implemented by changing the content which is broadcast on a particular analog channel. The split channel concept in this invention also allows channels to be split between video services and services of other media, such as text channels or web browsing time.

Figure 7:
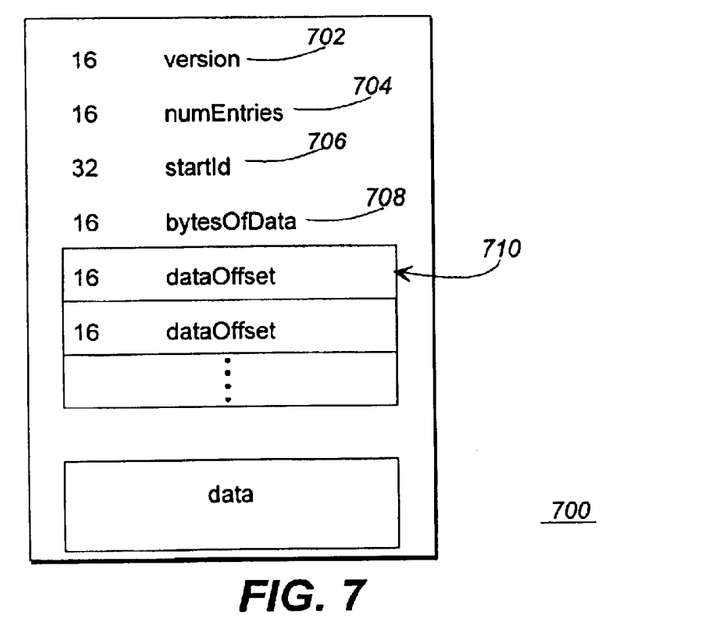
FIG. 7 is a block diagram representative of a logo table used in connection with the service application manager, in accordance with the instant invention.

The final SAM information table present in the instant invention is the Logo Table as illustrated in FIG. 7. The Logo Table 700 stores service logo data. The SAM server provides two different Logo Tables on the BFS, both transmitted in band. One table provides the default set of logos known by the SAM Server upon deployment of the cable system, in the present embodiment the range of default logo IDs is from 1–255 and is published including the name of the logo. The data for the default logo images can be stored in the nonvolatile memory of the HCT such that they can be retrieved very quickly and rendered by applications in the HCT. The set of default logos will never change, nor will the data in the default Logo Table.

New logos registered with services by the SAM server are stored in another Logo Table. The SAM client always loads this table into memory on the HCT during initialization, and it can be updated like any of the other SAM information tables. Accordingly, the Logo Table initial entry 702 relates to version numbers of the table.

All logos are encoded by the SAM Server using an encoder that translates a single common image format such as GIF into the particular format that the SAM is transmitting (and decoding within the SAM Client).

Application clients can access the logo data in the SAM in several ways. First, an application client can ask for the logo ID that corresponds to a particular service. If the logo ID is stored by the application client (one of the default logos), it can then draw the appropriate logo using its own data. Otherwise, the application client can ask the SAM client for the logo pixmap data, width, and height in a format compatible with the HCT OS drawing capabilities. A logoId of zero means no logo.

The structure of the Logo Table begins with a version number 702, number of logos 704 in the table, first logo ID in the table 706, and then the size of the logo data 708. Next is an index of logo data offsets 710, such that index equals the logo ID minus the starting logo ID of the table. The index for a logo contains the offset into the logo data segment where the actual image data for the logo is stored.

The primary functionality of the SAM is the activation of an application client on the DHCT, either to provide a specified service or because of a signaling message from the server. Typically the user of the DHCT will access services via the Display Channel Number (DCN). The SAM uses the Display Channel Table (DCT) to map a DCN to a ServiceId. "Split" channels are supported, such that one channel might provide multiple services, depending on the time of day. Given a service ID, the SAM Client first extracts the appropriate application URL BulkDataId from the Service record in the current Service Table, and then the actual URL string from the Bulk Table. It then asks the HCT Operating System ("OS") if the module with the application URL for the application is loaded in the HCT memory. If not, it requests that the OS load the module using the application URL. Once the application code is resident in the HCT, the SAM client launches the application module as an OS application (it may be that the application has already been launched). It then asks the OS to activate the application, given the module handle—this brings the application into focus. Finally, the SAM client sends a kEt_Activate message to the application client, including the service ID and the service parameter from the Service Table.

Application clients can also be activated by a message sent from the server. The SAM client must register with the HCT operating system to receive SAM signaling messages. The content of these messages is an application URL to activate and the data to pass the application as a parameter. The SAM client thus provides a mechanism whereby an application client can be activated given the application URL and some data. If the data type is an integer value, meaning the parameter itself, then it is passed directly to the application identified by the URL via a kEt_Activate message. However, if the parameter is a string or data, then it must be stored by the SAM client locally and given a BulkDataId in the range reserved for private client use. The SAM client will activate the application client. The Bulk-DataId is passed as the parameter, and a special id is used to signify a service activated via a pass-thru message. The application client can then use the SAM client API to retrieve the data given the bulk ID. Depending on the application, the private bulk data might be a URL string, an actual string to use directly, or data. The application client must be given the parameter type it is expecting; this must be verified by the SAM Server before the signaling message is sent. However, if the application client is expecting a string it must check whether the string is a URL or the content itself. If the application client is executing on behalf of the kSam_SignalingService, then it must delete the private bulk data when it suspends The SAM client can be asked to construct a kEt_Notify event with supplied parameters and forward it to designated application clients. Again, this can be done via a service ID or an application URL. The notification event type is supplemented with event data particular to the notification being sent (such as kEd_SamDataUpdated), an ID (typically the service ID), and two parameters.

The SAM client provides a facility whereby application clients can be queried to determine whether particular services are currently authorized. The SAM will look up the application URL for the requested service ID in the Service Table, and send the application client a kEt_IsAuthorized event requesting an asynchronous reply to a queue created within the SAM client API. The SAM client will wait on that queue until a kEt_AsyncResponse event is delivered by the application client, and then return the result to the caller of the SAM API. Thus, while the internals of the authorization query are asynchronous, the SAM Client API is synchronous. It is up to the application client to determine if the service is authorized, using whatever means necessary.

Application clients can be suspended by ServiceId or directly via application URL. Application clients can also be suspended as a result of a signaling message from the SAM Server.

Accordingly, in the system illustrated in FIGS. 1 and 2 it may be appreciated that the channel selection function of this system includes a plurality of channel cross reference tables as illustrated in FIGS. 3–7. These tables cross reference settop terminal channels with a variety of television services, or other services, such as various types of video and audio programming, and online services such as web casting and E-mail. Selection of a particular channel transfers control of that specific application program, along with one or more appropriate parameters obtained from the cross reference tables, and activates the service associated with that selected channel. In sum, the cross reference tables in FIGS. 3–7 are channel selection functions which enable the settop terminals to execute software and activate a variety of services. When a viewer of the system of FIG. 1 selects a channel, the HCT identifies the service associated with the selected channel from the Display Channel Table and then executes the appropriate application determined from the Service Table of FIG. 3.

Further, channel and service lineup can take place transparently to the viewer based on the data kept in the SAM client. This is important as subscribers often group together in blocks favorite types of programming so as to make access to those programs easier. In other words, a subscribers mapping of the settop terminal channels to television services is maintained even if the cable service provider reassigns the cable channels over which those services are transmitted. Accordingly, when such reassignment occurs, updated versions of the tables as specified hereinabove are transmitted from the SAM server to the SAM client, thus providing a transparent change in service channels for the SAM server operator through to the SAM client user. As an example, once parents configure channel settings to block particular services deemed inappropriate for children, a reassignment of cable channels over which those services are transmitted will not affect those services blocked status.

The manner in which requests for services are made by different applications within HCT are simplified by incorporating an application URL, similar to that used on the Internet, to uniformly identify application requested. In the context of services described hereinabove, it has been set forth that the service comprises a application and a parameter. The application in fact the URL to the executable application code, found either on the BFS or resident in HCT memory, while the parameter includes the data strings described herein above.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a cable television system having a headend and a settop, a method of activating a service provided by the headend to the settop, wherein the service is one service of a plurality of services provided by the headend to the settop, and wherein the method is implemented in the settop, the method comprising the steps of:

receiving from the headend a plurality of tables, wherein a first table of the plurality of tables includes multiple sets of service attributes, wherein each set of service attributes is associated with a particular service, wherein a second table includes a plurality of blocks of data, each block of data associating a service identifier with a valid channel number, wherein each block of data includes an attribute specifying the valid channel number is reachable by incrementing or decrementing channel numbers;

storing the plurality of tables in a memory of the settop;

receiving at the settop a signal associated with a specific service of the plurality of services provided by the headend, wherein the specific service has a set of service attributes associated therewith;

retrieving the set of service attributes associated with the specific service, wherein the step of retrieving includes the act of reading the set of service attributes associated with the specific service from the first table; and launching the specific service responsive to the set of service attributes associated with the specific service including a launch attribute permitting non-subscriber launch.

2. The method of claim 1, wherein the signal came from the headend.

3. The method of claim 1, wherein the launch attribute defines a repair-representative-only launch attribute, whereby only a repair representative of the cable television system can launch the specific service.

4. The method of claim 1, wherein the launch attribute defines a cable-operator-only launch attribute, whereby only a cable operator of the cable television system can launch the specific service.

5. The method of claim 1, wherein the launch attribute defines an installer-only launch attribute, whereby only an installer for the cable television system can launch the specific service.

6. The method of claim 1, wherein the launch attribute permits non-subscriber launch and subscriber launch.

7. The method of claim 1, further including the step of:
launching the specific service in accordance with a service activation time associated with a launch-by-time attribute.

8. The method of claim 7, wherein the specific service is launched after a prespecified time after receiving the signal.

9. The method of claim 7, wherein the service activation time is designated by subscriber input.

10. The method of claim 7, wherein the service activation time is designated by headend.

11. The method of claim 7, wherein the service activation time includes periodic pre-specified interval values.

12. The method of claim 11, wherein the periodic pre-specified interval values are specified by the subscriber.

13. The method of claim 11, wherein the periodic pre-specified interval values of the service activation time are specified by the headend, whereby the specific service is launched at the settop in accordance with the periodic pre-specified intervals.

14. The method of claim 7, wherein the specific service is a ticker tape that periodically displays information.

15. The method of claim 1, further including the step of:
establishing a communication link between a computing device coupled to the settop and the headend of the broadcast television system.

16. The method of claim 15, prior to the step of establishing the communication link, further including the step of:
launching the specific service in the background, wherein the specific service is not visible to a viewer, when the set of service attributes associated with the specific service includes a background attribute.

17. The method of claim 1, wherein the plurality of tables includes a second table that associates channel numbers with service identifiers and associates service identifiers with channel numbers, and wherein a third table associates service identifiers with applications and sets of parameters, wherein each service of the plurality of services provided by the headend is associated with a unique service identifier and defined by a particular application and a particular set of parameters.

18. The method of claim 17, wherein the second table includes a bitmap for indicating whether a channel number is valid.

19. The method of claim 18, wherein the bitmap represents a contiguous range of channel numbers, each bit of the bitmap representing a particular channel number, and each bit that represents a valid channel number is set to a predetermined value.

20. The method of claim 1, wherein each block of data has a service identifier field and a channel number field, and the blocks of data are arranged such that the service identifiers in the service identifier fields are increasing in magnitude and non-contiguous.

21. The method of claim 1, further including the steps of:
accessing a specific block of data of the plurality of data blocks, whereby the specific block of data contains the unique service identifier of the specific service; and
retrieving the channel number associated with the service identifier.

22. The method of claim 21, wherein the step of accessing a specific block of data further includes the step of:
searching on the plurality of data blocks to find the specific block of data that contains the unique service identifier of the specific service.

23. The method of claim 22, wherein the second table includes a sequence of offset values to access the data blocks.

24. The method of claim 22, wherein the blocks of data are arranged such that service identifier in each service identifier field is in increasing order.

25. The method of claim 24, wherein the service identifiers are non-contiguous.

26. The method of claim 22, wherein the channel numbers in the channel number fields in the blocks of data are non-contiguous.

27. The method of claim 1, wherein at least one table of the plurality of tables includes at least one field of variable length.

28. The method of claim 1, wherein a given table of the plurality of tables stored in the memory has a version number associated therewith, and further including the steps of:
receiving from the headend a particular table having a version number associated therewith, wherein the particular table corresponds to the given table and includes new information; and
comparing the version number of the particular table to the version number of the given table; and
responsive to the particular table being a newer version of the given table, storing the particular table in the memory.

29. The method of claim 28, wherein the given table is retained in the memory while the processor stores the particular table in the memory.

30. The method of claim 29, wherein the given table is continued to be effective and used while the processor stores the particular table in the memory.

31. The method of claim 29, further including the steps of:
reading the particular tables;
updating the given table with new information from the particular file, wherein while the given table is being updated the given table and particular table are locked.

32. The method of claim 31, further including the step of:
unlocking the given table after the given table has been updated with the new information included in the particular table.

33. The method of claim 1, wherein the set of service attributes includes a not-blockable-by-viewer attribute, wherein the specific service cannot be blocked by the viewer when the set of service attributes includes the not-blockable-by-viewer attribute.

34. The method of claim 1, wherein the set of service attributes includes an identity attribute.

35. The method of claim 34, wherein the identity attribute includes textual information.

36. The method of claim 34, wherein the identity attribute includes a logo.

37. The method of claim 34, wherein the identity attribute includes audio information.

38. The method of claim 34, wherein the identity attribute is to be effected for sensing by a viewer at the time the service is suspended for a prespecified time.

39. The method of claim 34, wherein the identity attribute is effected for sensing by a viewer for a prespecified time.

40. The method of claim 34, wherein the identity attribute is to be effected for sensing by a viewer at the time the service is launched.

41. The method of claim 34, wherein the identity attribute is to be effected for sensing by a viewer at the time the service is terminated.

42. The method of claim 34, wherein the identity attribute is to be effected for sensing by a viewer at the time the service is suspended.

43. The method of claim 34, wherein the identity attribute is to be effected for sensing by a viewer at the time the service is launched for a prespecified time.

44. The method of claim 34, wherein the identity attribute is to be effected for sensing by a viewer at the time the service is terminated for a prespecified time.

45. The method of claim 34, wherein the identity attribute includes a special effect.

46. The method of claim 45, wherein the special effect includes animated transitions, graphic transitions, morphing, implosions, and fading.

47. The method of claim 45, wherein the special effect includes a video widget.

48. The method of claim 1, further including the steps of:
receiving from the headend a plurality of tables, wherein a first table of the plurality of tables includes multiple application identifiers, wherein each one of the multiple application identifiers is associated with a particular application; and
storing the plurality of tables in a memory of the settop, wherein the memory of the settop has multiple applications stored therein;
accessing the first table and at least a second table of the plurality of tables to determine a specific application identifier and a specific set of parameters, wherein the specific application identifier identifies a specific application, and the specific application and the specific set of parameters define the specific service; and
using the specific application identifier to retrieve the specific application; and
wherein the act of launching the specific service includes the act of activating the specific application with the specific set of parameters.

49. The method of claim 48, further including the step of:
responsive to the memory of the settop not having the specific application stored therein, downloading the specific application from the headend.

50. A settop in a broadcast television system having a headend, the settop comprising:
a port for receiving a plurality of services broadcast from the headend and for receiving a plurality of tables, wherein each service of the plurality of services is associated with a unique service identifier, wherein a first table of the plurality of tables includes multiple sets of service attributes that are associated with the service identifiers of the plurality of services, and a second table of the plurality of tables includes multiple application identifiers and multiple sets of parameters, wherein each service of the plurality of services is defined by a particular application identified by one of the application identifiers and a particular set of parameters;
a processor in communication with a subscriber input device and with the headend, responsive to the processor receiving a signal associated with a specific service of the plurality of services, the specific service associated with a specific service identifier, the processor accessing the first table to retrieve the set of service attributes associated with the specific service identifier and accessing the second table of the plurality of tables to identify a specific application and a specific parameter set, wherein the specific application and the specific parameter set define the specific service, the processor using the set of service attributes associated with the specific service to activate the specific application with the specific set of parameters; and
a memory in communication with the port and the processor, the memory having the plurality of tables stored therein,
wherein the plurality of tables includes a third table that associates channel numbers with service identifiers and associates service identifiers with channel numbers, and responsive to the processor receiving the signal from the subscriber input, the processor accesses the third table to determine the specific service identifier associated with the specific service, wherein the third table includes a bitmap for indicating whether a channel number is valid and a plurality of blocks of data, wherein each block of data has a service identifier field and a channel number field, and wherein each block of data further includes an attribute specifying that the channel associated with that block of data is reachable by incrementing or decrementing channel numbers with an input device.

51. The settop of claim 50, wherein the retrieved set of service attributes includes a launch attribute permitting non-subscriber launch.

52. The settop of claim 51, wherein the launch attribute is a repair-representative-only launchable service.

53. The settop of claim 51, wherein the launch attribute is a cable-operator-only launchable service.

54. The settop of claim 51, wherein the launch attribute is an installer-only launchable service.

55. The settop of claim 51, wherein the launch attribute permits non-subscriber launch and subscriber launch.

56. The settop of claim 50, wherein the set of service attributes for the specific service includes a launch-by-time attribute having a service activation time associated therewith, wherein the processor launches the specific service in accordance with the service activation time.

57. The settop of claim 56, wherein the specific service is launched after a prespecified time after receiving the signal.

58. The settop of claim 56, wherein the service activation time is designated by subscriber input.

59. The settop of claim 56, wherein the service activation time is designated by headend.

60. The settop of claim 56, wherein the service activation time includes periodic pre-specified interval values.

61. The settop of claim 60, wherein the periodic pre-specified interval values are specified by the subscriber.

62. The settop of claim 60, wherein the periodic pre-specified interval values are specified by the headend.

63. The settop of claim 56, wherein the specific service is a ticker tape that periodically displays information.

64. The settop of claim 50, further including:
a second port in communication with a computing device, wherein the computing device is located at a premises remote from the headend.

65. The settop of claim 64, wherein the set of service attributes for the specific service includes a background attribute, and the specific service establishes a communication link between the computing device and the headend.

66. The settop of claim 50, wherein the memory includes a fourth table that associates a first logo with a first service identifier.

67. The settop of claim 66, wherein the particular set of service attributes includes a logo identification attribute, wherein responsive to a logo identification equal to zero, the processor disregards a logo with the identity attribute of the specific service.

68. The settop of claim 66, wherein the fourth table includes a first index of logo identifiers, the first index associating an offset with each logo, wherein a particular offset indicates the location of a particular block of data in the fourth table corresponding to the image of a particular logo.

69. The settop of claim 68, wherein the memory is non-volatile memory.

70. The settop of claim 69, wherein the logos are considered permanent.

71. The settop of claim 66, wherein the memory includes a fifth table that associate a second logo with a second service identifier.

72. The settop of claim 71, wherein the fifth table includes an index of logo identifiers, the first index associating an offset with each logo, wherein a particular offset indicates the location of a particular block of data in the fourth table corresponding to the image of a particular logo.

73. The settop of claim 50, wherein the bitmap represents a contiguous range of channel numbers, each bit of the bitmap representing a particular channel number, and each bit that represents a valid channel number is set to a predetermined value.

74. The settop of claim 50, wherein the third table includes a sequence of offset values to access the data blocks.

75. The settop of claim 50, wherein each service identifier field carries a service identifier, and the blocks of data are arranged such that the service identifiers are in increasing magnitude.

76. The settop of claim 75, wherein the service identifiers are non-contiguous.

77. The settop of claim 50, wherein at least one table of the plurality of tables includes at least one field of variable length.

78. The settop of claim 50, wherein a given table of the plurality of tables stored in the memory has a version number associated therewith, and upon receiving from the headend a particular table having a version number associated therewith, wherein the particular table corresponds to the given table, the processor compares the version number of the particular table to the version number of the given table, and responsive to the particular table being a newer version of the given table, the processor stores the particular table in the memory.

79. The settop of claim 78, wherein the given table is retained in the memory while the processor stores the particular table in the memory.

80. The settop of claim 79, wherein the given table is continued to be effective and used while the processor stores the particular table in the memory.

81. The settop of claim 79, wherein both the given table and particular table are not accessible after the processor completes storing the particular table in the memory.

82. The settop of claim 81, wherein thereafter the given table becomes obsolete, the particular table becomes effective, and the particular table becomes accessible.

83. The settop of claim 50, wherein the particular set of service attributes includes a not-blockable-by-viewer attribute, wherein responsive to the not-blockable-by-viewer attribute, the processor disregards subscriber input that would attempt to block the specific service.

84. The settop of claim 50, wherein the particular set of service attributes includes an identity attribute.

85. The settop of claim 84, wherein the identity attribute includes textual information.

86. The settop of claim 84, wherein the identity attribute includes a logo.

87. The settop of claim 84, wherein the identity attribute includes audio information.

88. The settop of claim 84, wherein the identity attribute is effected for sensing by a viewer for a prespecified time.

89. The settop of claim 84, wherein the identity attribute is to be effected for sensing by a viewer at the time the service is launched.

90. The settop of claim 84, wherein the identity attribute is to be effected for sensing by a viewer at the time the service is terminated.

91. The settop of claim 84, wherein the identity attribute is to be affected for sensing by a viewer at the time the service is suspended.

92. The settop of claim 84, wherein the identity attribute is to be effected for sensing by a viewer at the time the service is launched for a prespecified time.

93. The settop of claim 84, wherein the identity attribute is to be effected for sensing by a viewer at the time the service is terminated for a prespecified time.

94. The settop of claim 84, wherein the identity attribute is to be effected for sensing by a viewer at the time the service is suspended for a prespecified time.

95. The settop of claim 84, wherein the identity attribute includes a special effect.

96. The settop of claim 95, wherein the special effect includes animated transitions, graphic transitions, morphing, implosions, and fading.

97. The settop of claim 95, wherein the special effect includes a video widget.

98. The settop of claim 95, wherein the port is coupled to the headend via a communication link having at least an in-band communication path and an out-of-band communication path, wherein the in-band communication path carries multiple services and at least one table of the plurality of tables, and the out-of-band communication path carries at least one table of the plurality of tables.

99. In a cable television system having a headend and a settop, a method of activating a service provided by the headend to the settop, wherein the service is one service of a plurality of services provided by the headend to the settop, and wherein the method is implemented in the settop, the method comprising the steps of:

receiving at the settop a channel number, which is associated with a specific service of the plurality of services provided by the headend, from a subscriber input device, wherein each service of the plurality services is identified by a unique service identifier and defined by a specific application and a specific set of parameters, wherein the unique service identifiers form a non-contiguous set of values;

accessing a first table of a plurality of tables to determine a specific service identifier, wherein the first table maps non-contiguous channel numbers to the service identifiers, wherein the first table includes a bitmap for indicating whether a channel number is valid, and wherein the first table further includes a plurality of blocks of data, each block of data associating a service identifier with a valid channel number;

counting the number of bits representing valid channels between and inclusive of a first bit and a second bit of the bit map to determine an index value, wherein the second bit represents a specific channel number;

accessing a second table of the plurality of tables using the specific service identifier to determine a particular application and a particular set of parameters; and launching the particular application with the particular set of parameters.

100. The method of claim 99, wherein the bitmap represents a contiguous range of channel numbers, each bit of the bitmap representing a particular channel number, and each bit that represents a valid channel number is set to a predetermined value.

101. The method of claim 99, further including the steps of:

accessing a specific block of data of the plurality of data blocks using the index value, wherein the specific block of data associates the specific channel number with a specific service identifier.

102. The method of claim 101, wherein a partial sum of the number of valid channels is retrieved from a table.

103. The method of claim 102, wherein the second table includes a sequence of offset values, wherein the step of accessing a specific block of data further includes the steps of:

retrieving an offset into the plurality of data blocks using the index value from the sequence of offsets, wherein the retrieved offset is a given number of offsets into the sequence of offsets, the given number equaling the index value.

104. The method of claim 103, wherein each block of data of the plurality of blocks of data further includes an attribute specifying that the channel associated with that block of data is reachable by incrementing or decrementing channel numbers with an input device.

105. The method of claim 99, wherein the second table includes fields of variable length.

* * * * *